United States Patent
Nilsson et al.

(10) Patent No.: US 11,084,486 B2
(45) Date of Patent: *Aug. 10, 2021

(54) METHOD AND SYSTEM FOR HANDLING CONDITIONS OF A ROAD ON WHICH A VEHICLE TRAVELS

(71) Applicant: Volvo Car Corporation, Gothenburg (SE)

(72) Inventors: Jonas Nilsson, Molndal (SE); Mats Jonasson, Partille (SE); Mattias Brännström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 214 days.

This patent is subject to a terminal disclaimer.

(21) Appl. No.: 16/361,272

(22) Filed: Mar. 22, 2019

(65) Prior Publication Data
US 2019/0291718 A1    Sep. 26, 2019

(30) Foreign Application Priority Data

Mar. 26, 2018   (EP) ................................ 18163844

(51) Int. Cl.
*B60W 30/02*    (2012.01)
*B60T 8/1764*    (2006.01)
(Continued)

(52) U.S. Cl.
CPC ........... *B60W 30/02* (2013.01); *B60T 8/1755* (2013.01); *B60T 8/1764* (2013.01);
(Continued)

(58) Field of Classification Search
CPC ........ G05D 2201/0213; G05D 1/0088; B60W 2556/50; B60W 2556/65; B60W 2420/42;
(Continued)

(56) References Cited

U.S. PATENT DOCUMENTS 5,163,319 A      11/1992   Spies et al.
10,384,672 B1 *   8/2019   Katzourakis .......... B60W 10/04
(Continued)

FOREIGN PATENT DOCUMENTS

CN      101777253 A         7/2010
CN      105584485 A  *     5/2016  ........... G08G 1/0133
(Continued)

OTHER PUBLICATIONS

Sep. 26, 2018 European Search Report issue on International Application No. EP18163844.

*Primary Examiner* — Atul Trivedi
(74) *Attorney, Agent, or Firm* — Clements Bernard Walker; Christopher L. Bernard

(57) ABSTRACT

A method performed by a vehicle system for handling conditions of a road on which a vehicle travels. The vehicle system detect that a first part of the road has a first condition which is different from a second condition of a second part of the road. The vehicle system estimates friction of the first part and evaluates the estimated friction. The vehicle system determines that the vehicle's motion should be adjusted when a result of the evaluation indicates that the estimated friction of the first part of the road affects the vehicle's expected motion, and initiates adjustment of the vehicle's motion on the road as determined.

20 Claims, 3 Drawing Sheets

(51) Int. Cl.
*G05D 1/00* (2006.01)
*B60T 8/1755* (2006.01)

(52) U.S. Cl.
CPC ...... *G05D 1/0088* (2013.01); *B60T 2210/124* (2013.01); *B60T 2270/30* (2013.01); *B60W 2420/42* (2013.01); *B60W 2552/40* (2020.02); *B60W 2556/50* (2020.02); *B60W 2556/65* (2020.02); *B60W 2710/18* (2013.01); *B60W 2756/10* (2020.02); *G05D 2201/0213* (2013.01)

(58) Field of Classification Search
CPC ............. B60W 30/02; B60W 2756/10; B60W 2552/40; B60W 2710/18; B60W 2720/10; B60T 2270/30; B60T 8/1755; B60T 8/1764; B60T 2210/124
USPC .......................................................... 701/23
See application file for complete search history.

(56) References Cited

U.S. PATENT DOCUMENTS

| | | | |
|---|---|---|---|
| 10,589,738 B1* | 3/2020 | Boecker | B60T 8/17616 |
| 10,773,725 B1* | 9/2020 | Ilievski | B60W 40/068 |
| 2002/0072841 A1* | 6/2002 | Kogure | B60W 40/064 |
| | | | 701/80 |
| 2002/0087251 A1* | 7/2002 | Kogure | B60T 8/172 |
| | | | 701/80 |
| 2007/0188020 A1 | 8/2007 | Schmidt et al. | |
| 2011/0264300 A1* | 10/2011 | Tuononen | G01M 17/02 |
| | | | 701/1 |
| 2011/0295464 A1* | 12/2011 | Zagorski | B60W 50/06 |
| | | | 701/41 |
| 2012/0022747 A1* | 1/2012 | Zagorski | B60T 8/172 |
| | | | 701/48 |
| 2013/0141577 A1 | 6/2013 | Yoo | |
| 2015/0019094 A1* | 1/2015 | Larkin | B60K 23/0808 |
| | | | 701/65 |
| 2015/0166072 A1* | 6/2015 | Powers | G08G 1/0129 |
| | | | 701/1 |
| 2015/0251656 A1* | 9/2015 | Yester | B60W 10/20 |
| | | | 701/41 |
| 2015/0251659 A1* | 9/2015 | Fischer | B60T 8/1725 |
| | | | 382/104 |
| 2015/0251664 A1* | 9/2015 | Zagorski | B60W 30/09 |
| | | | 701/41 |
| 2015/0344037 A1* | 12/2015 | Siegel | G01N 19/02 |
| | | | 73/9 |
| 2015/0371095 A1* | 12/2015 | Hartmann | G06K 9/6267 |
| | | | 348/148 |
| 2015/0375753 A1* | 12/2015 | Schrabler | B60W 40/068 |
| | | | 701/71 |
| 2016/0368503 A1* | 12/2016 | Jonasson | B60W 40/064 |
| 2018/0060674 A1* | 3/2018 | Zhao | G06K 9/6293 |
| 2018/0194286 A1* | 7/2018 | Stein | G06K 9/00791 |
| 2019/0291718 A1* | 9/2019 | Nilsson | B60T 8/1755 |
| 2020/0074639 A1* | 3/2020 | Zhao | G06K 9/00791 |
| 2020/0089243 A1* | 3/2020 | Poeppel | B60W 50/0097 |
| 2020/0094843 A1* | 3/2020 | Barecke | B60T 8/172 |

FOREIGN PATENT DOCUMENTS

| | | | | |
|---|---|---|---|---|
| DE | 4027356 A1 | 3/1991 | | |
| EP | 0710817 A1 | 1/1995 | | |
| EP | 3037314 A1 | 6/2016 | | |
| WO | 2004074582 A2 | 9/2004 | | |
| WO | WO-2010031905 A1 * | 3/2010 | ............ | G01M 17/02 |
| WO | 2016192806 A1 | 12/2016 | | |

* cited by examiner

METHOD AND SYSTEM FOR HANDLING CONDITIONS OF A ROAD ON WHICH A VEHICLE TRAVELS

CROSS-REFERENCE TO RELATED APPLICATION

The present patent application/patent claims the benefit of priority of co-pending European Patent Application No. 18163844.6, filed on Mar. 26, 2018, and entitled "METHOD AND SYSTEM FOR HANDLING CONDITIONS OF A ROAD ON WHICH A VEHICLE TRAVELS," the contents of which are incorporated in full by reference herein.

TECHNICAL FIELD

Embodiments herein relate generally to a vehicle system, a method performed by the vehicle system and a vehicle comprising the vehicle system. More particularly the embodiments herein relate to handling conditions of a road on which a vehicle travels.

BACKGROUND ART

Vehicles need to drive safely, also considering challenging use cases related to tire-to-road friction. This is important for manual, semi-autonomous and fully autonomous vehicles. Driving safely in treacherous road friction conditions is challenging for both human and automated drivers.

A road condition may be treacherous when the friction characteristics are different in different parts of the roadway. Tracks and patches are examples of road conditions which may be treacherous Tracks may be for example wet lane markings, wheel tracks in snow, water filled tracks, thick piles of snow between wheel tracks, tracks filled with water, loose gravel outside wheel tracks (especially in spring time), dirt road with loose gravel outside the wheel tracks. In these track conditions, there is a difference in road friction depending on where the vehicle is positioned laterally on the road.

Examples of patches may be for example spilled oil, ice or sand in the road intersection only etc. In patch conditions, there is a difference in road friction depending on where the vehicle is positioned laterally and longitudinally on the road.

These conditions often lead to longer stopping distances, slower take-off from a stationary mode, and stability problems. The latter is prominently in case of different friction between the left and right sides of the vehicle, i.e. split-mu, and is exaggerated if the vehicle has a degraded brake system, e.g. two-wheel braking only.

Therefore, there is a need to at least mitigate or solve these issues.

SUMMARY

An objective of embodiments herein is therefore to obviate at least one of the above disadvantages and to provide improved handling of conditions of the road on which a vehicle travels.

According to a first aspect, the object is achieved by a method performed by a vehicle system for handling conditions of a road on which a vehicle travels. The vehicle system detects that a first part of the road has a first condition which is different from a second condition of a second part of the road. The vehicle system estimates friction of the first part, and evaluates the estimated friction. The vehicle system determines that the vehicle's motion should be adjusted based on that a result of the evaluation indicates that the estimated friction of the first part of the road affects the vehicle's expected motion. The vehicle system initiates adjustment of the vehicle's motion on the road as determined.

According to a second aspect, the object is achieved by a vehicle system for handling vehicle feature information. The vehicle system is adapted to detect that a first part of the road has a first condition which is different from a second condition of a second part of the road. The vehicle system is adapted to estimate friction of the first part, and to evaluate the estimated friction. The vehicle system is adapted to determine that the vehicle's motion should be adjusted based on that a result of the evaluation indicates that the estimated friction of the first part of the road affects the vehicle's expected motion. The vehicle system is adapted to initiate adjustment of the vehicle's motion on the road as determined.

According to a third aspect, the object is achieved by a vehicle comprising the vehicle system.

Since the result of the evaluation indicates that the estimated friction of the first part of the road affects the vehicle's expected motion, the adjustment of the vehicle's motion can be initiated so improved handling of conditions of the road on which a vehicle travels is obtained, for example by obtaining appropriate driving strategies and detection for treacherous road condition.

Embodiments herein afford many advantages, of which a non-exhaustive list of examples follows:

An advantage of the embodiments herein is that it is possible to avoid planning backup or evasive manoeuvres where there is a risk for the vehicle's tires to come into contact with tracks of lower friction during a long time period.

Another advantage of the embodiments herein is that safety is improved since the vehicle's motion can be adjusted so that it avoids positioning the vehicle at the road part which has low friction. This also makes the vehicle easier to steer.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DESCRIPTION OF EMBODIMENTS

The embodiments herein relate to detecting treacherous road friction conditions and to providing safe strategies for driving under such conditions.

Figure 1:
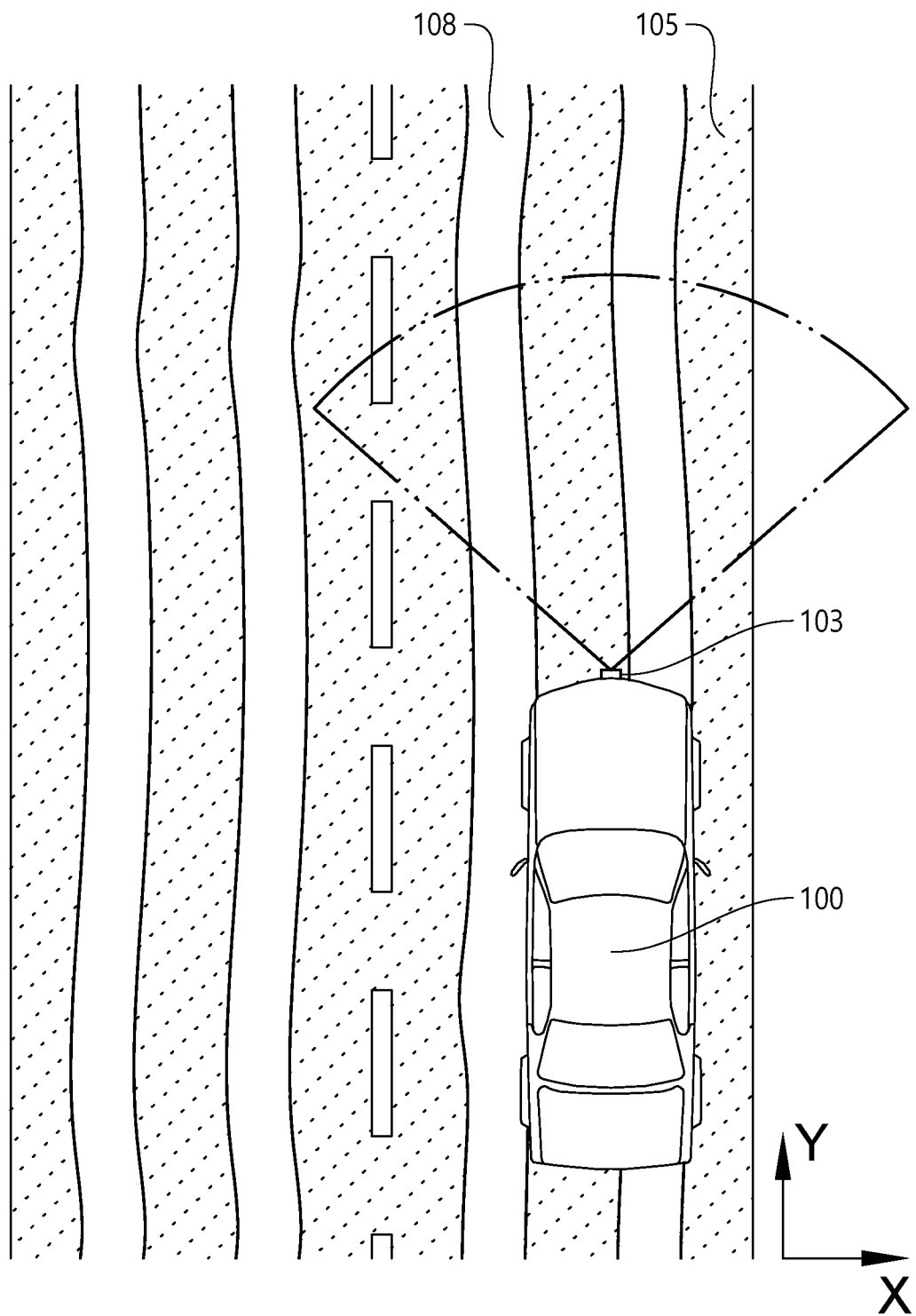
FIG. 1 is a schematic diagram illustrating a vehicle on a road with a first part of a first condition.

FIG. 1 is a schematic drawing illustrating a vehicle 100 located on a road. The vehicle 100 may be any arbitrary vehicle, for instance a car, truck, lorry, van, bus, motorcycle etc. The vehicle 100 may be at least partly autonomous or self-driven, it may be completely autonomous or self-driven, or it may be non-autonomous, i.e. manual etc. The vehicle 100 may be standing still or it may be moving with a velocity and in a direction.

The road may be for example a highway, a city street, a gravel road etc. The road surface may be of asphalt, concrete, gravel, cobble stone, bricks, etc. The road may have one, two or more lanes. In FIG. 1, the road is exemplified with two lanes which are separated by a longitudinal road marking. The longitudinal direction is in a y-direction as illustrated in the coordinate system in FIG. 1, the y-direction is also direction in which the vehicle 100 travels. A lateral direction is the x-direction indicated in the coordinate system.

The vehicle 100 comprises an image capturing device 103. The image capturing device 103 is adapted to capture images of at least the outdoor surroundings of the vehicle 100, e.g. the road. The image capturing device 103 may be a camera, a radar, a lidar, etc. The image capturing device is exemplified in FIG. 1 to be positioned at the front of the vehicle 100, e.g. at the bumper. However, any other suitable position may be applicable in which the image capturing device 103 is able to capture images of the surroundings of the vehicle 100. The image capturing device 103 may be a front-looking device capturing images of the surroundings ahead of the vehicle 100, the image capturing device 103 may be a front and side-ways looking device capturing images of the surroundings ahead and on the side of the vehicle 100 etc.

As seen in FIG. 1, the road comprises at least one first part 105 and at least one second part 108. The first part 105 of the road has a first condition which is different from a second condition 108 of the second part of the road. The first part 105 is illustrated with dotted filling in FIG. 1, and the second part 108 is illustrated with blank filling. The first part 105 may be tracks or patches, as defined earlier. In FIG. 1, the first part 105 is exemplified as snow between the wheel tracks. The second part 108 is exemplified as being a clean road surface not being covered by snow. The road with the first and second parts 105 having different friction characteristics may be referred to as a split-mu road.

Figure 2:
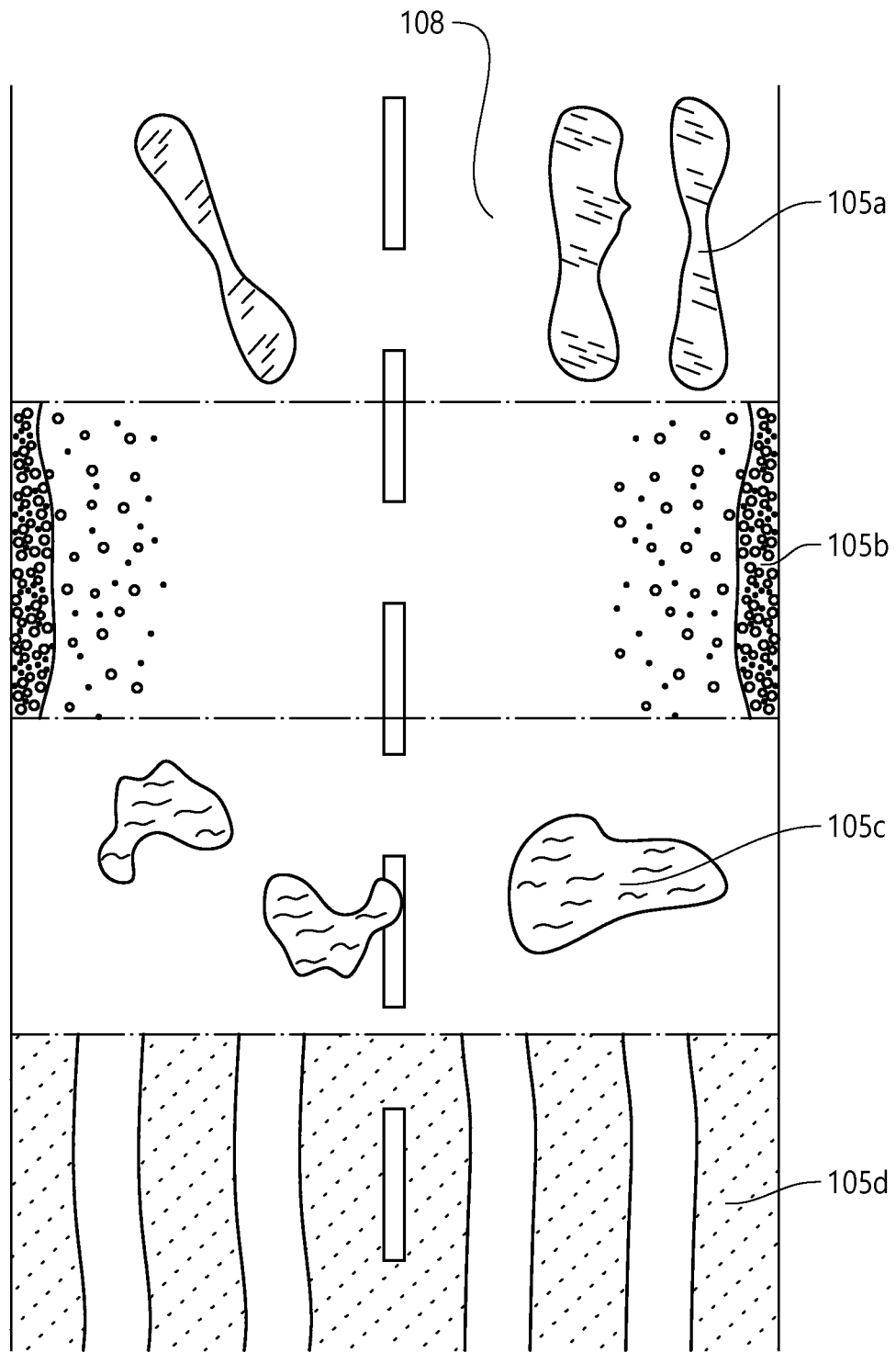
FIG. 2 is a schematic drawing illustrating examples of the first condition.

FIG. 2 illustrates examples of other types of the first part 105. Reference number 105a illustrates an example where the first part 105 is ice, reference number 105b illustrates an example where the first part 105 is gravel outside the wheel tracks, reference number 105c illustrates an example where the first part 105 is spilled oil and reference number 105d illustrates an example where the first part 105 is thick piles of snow between wheel tracks. Note that these are only examples of first parts 105, and that any other types of first parts 105 are equally applicable.

Figure 3:
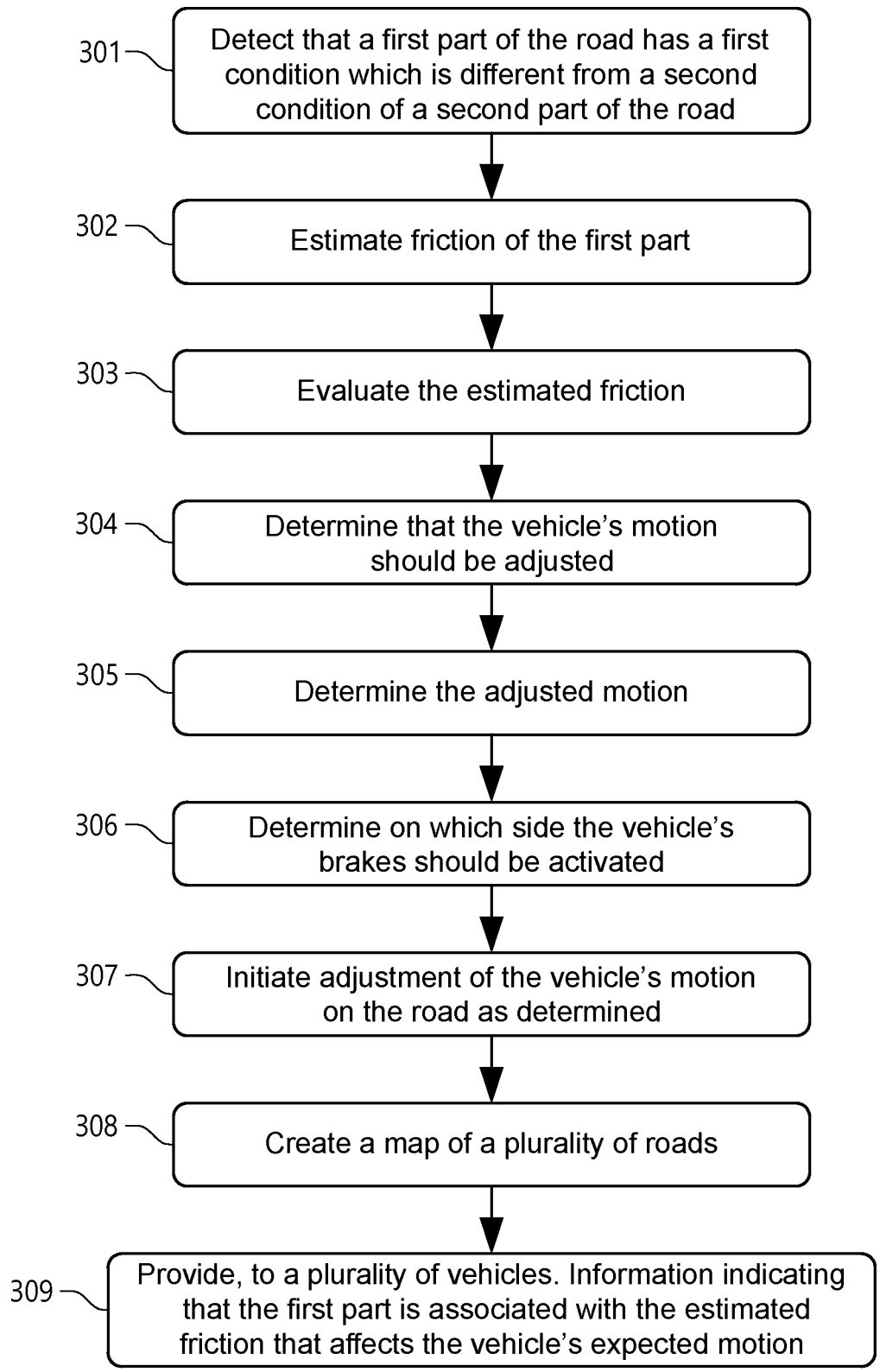
FIG. 3 is a flow chart illustrating a method.

FIG. 3 illustrates a method performed by a vehicle system for handling conditions of a road on which the vehicle 100 travels. The vehicle 100 may comprise at least one brake on each lateral side of the vehicle 100. The vehicle system may be comprised in the vehicle 100, or the vehicle system may be an external vehicle system adapted to communicate with the vehicle 100. The vehicle 100 may be a non-autonomous vehicle, a partly autonomous vehicle or a fully autonomous vehicle. The method comprises at least one of the following steps, which steps may be performed in any suitable order than described below:

Step 301:
The vehicle system detects that the first part 105 of the road has a first condition which is different from a second condition 108 of a second part of the road. The first part 105 may have a lower friction than the second part 108. The first condition may be at least one of: patches and tracks. The detection may be done in different ways.

For example, the detection may be performed based on at least one image of the road obtained by an image capturing device 103 comprised in the vehicle 100. Thus, the detection may be visual detection, i.e. detection of different visual characteristics between the first and second parts 105, 108. The image capturing device 103 may obtain one image or it may obtain two or more images over time.

In another example, the detection may be performed based on obtained measurements from a friction sensor associated with at least one of the vehicle's wheels.

Step 302:
The vehicle system estimates friction of the first part 105. The estimation may be performed based on the detection in step 301. The vehicle system may also estimate the friction of the second part 108.

The term split-mu may be used in association a road having a first and second part 105, 108 with different conditions, i.e. friction characteristics. Split-mu may also be referred to as split friction, and refers to a road condition that occurs when the friction differs between the first and second parts 105, 108 of the road.

In one example where the first part 105 is a road marking, the friction may be estimated by using the measured reflectivity of road markings over time. New road markings may be detected by measuring their reflectivity in absolute numbers overtime, i.e. compare with previous measurement to detect differences. Wet road markings are much more slippery when they are new due to lots of glass beads on the marking surface.

In another example, the first part 105 is a thick pile of snow between wheel tracks and the second part 108 is a part without snow, i.e. the first and second parts 105, 108 have different visual characteristics. In such example, images captured by the image capturing device 103 may be used to detect tracks and/or patches with different visual characteristics. The vehicle motion may be actively controlled to estimate friction in the detected tracks and/or patches. This may be coordinated using a fleet of vehicles to build a map over tracks and patches, which will be described in more detail in step 308 below.

The friction may be estimated by obtaining friction data from a friction sensor, for example comprised in at least one wheel of the vehicle 100.

Step 303:
The vehicle system evaluates the estimated friction. The result of the evaluation may indicate that the estimated friction is associated with that the first condition is a treacherous condition. A treacherous condition may be a condition that has a lower friction than the second part 108, and a treacherous condition affects the vehicle's expected motion when the vehicle 100 is located at the first part 105 having the treacherous condition. Using other words, the estimated friction of the first part 105 may lead to that the vehicle 100 deviates from its planned, normal or desired vehicle trajectory. The road may affect the vehicle's expected motion for example in that it is difficult to steer the vehicle 100 due to the low friction due to e.g. ice.

Step 304:
The vehicle system determines that the vehicle's motion should be adjusted when the result of the evaluation indicates that the estimated friction of the first part 105 of the road affects the vehicle's expected motion. The expected motion is a motion that has been previously determined. The motion to be adjusted is the future motion of the vehicle 100 which it should have when taking the first part into account, instead of the expected motion.

Step 305:

The vehicle system may determine the vehicle's adjusted motion. Using other words, determining how the vehicle's motion should be adjusted, i.e. an adjusted trajectory. Thus, the road condition information may be applied for vehicle navigation.

The adjusted motion may be such that vehicle 100 is avoided to be located at the first part 105 of the road which is considered to have treacherous road friction conditions. The adjusted motion may be such that the vehicle 100 avoids backup/evasive manoeuvres where there is a risk for the vehicle's tires to come into contact with a first part 105 having a lower friction during a long time period, and/or the adjusted motion may be such that the manoeuvre is kept on the side of the tracks or the racks are put between the wheels. If this is not possible, the motion may be adjusted by reducing the vehicle's speed to manage longer stopping distance etc. It may also comprise to adjust the vehicle's lateral position when the first part 105 is detected to find a second part 108 with higher friction. The adjusted motion may prevent the vehicle 100 from stopping on the first part 105 to ensure maximum grip when taking off. It may further comprise to plan straight trajectories when crossing a first part 105, e.g. thick piles of snow between wheel tracks, with very low friction. Steering when passing the first part 105 will most likely not be possible or risk causing instability.

The vehicle's motion may be adjusted so that the activated brakes are on the opposite side compared to the first part 105 of the road.

The vehicle's motion may be adjusted by adjusting at least one of: the vehicle's lateral position, the vehicle's longitudinal position and the vehicle's speed.

Initiating adjustment of the vehicle's motion may also involve determining a trajectory which the vehicle 100 should follow in order to avoid being located in the first part 105 of the road.

Step 306:

As mentioned earlier, the vehicle 100 may comprise at least one brake on each side of the vehicle 100. The side may be a lateral or longitudinal side. The vehicle system may determine on which side the vehicle's wheel brakes should be activated. The side may be for example right or left side, front or rear side etc.

For example, the activated brake should be for at least one wheel which is located on the same side as the high friction road part when differential braking is used to steer the vehicle 100. Consequently, the brakes on the opposite or other side should not be activated, or activated with an activation magnitude that is smaller than for the high friction part. The brakes of the wheels located on the high friction road part may be activated with a first magnitude and the brakes of the wheels located on a low friction side may be activated with a second magnitude. The first magnitude may be larger than the second magnitude.

This may also be referred to as split-mu braking and may be described as the vehicle 100 brakes on the road with a left-right asymmetrical friction coefficient. As an example, the split-mu road comprises a first part 105 being a strip of ice on one side of the road, and a second part 108 being dry asphalt on the other side of the road. A heavy braking on the brakes on both sides of a road having a split-mu surface may cause the vehicle 100 to skid or spin or lose the steering control. However, step 306, only activates the brakes on one side to avoid skid, spinning or losing the steering.

Below are some examples of combinations of brakes that may be activated:

| Activated brakes | Not activated brakes |
|---|---|
| Front left brake | Front right brake, rear right brake and rear left brake |
| Front right brake | Front left brake, rear right brake and rear left brake |
| Front left brake and front right brake | Rear left brake and rear right brake |
| Rear right brake and rear left brake | Front right brake and front left brake |
| Front left brake and rear left brake | Front right brake and rear right brake |
| Front right brake and rear right brake | Front left brake and rear left brake |
| Front right brake and rear left brake | Front left brake and rear right brake |
| Front left brake and rear right brake | Front right brake and rear left brake |

Step 307:

The vehicle system initiates adjustment of the vehicle's motion on the road as determined. The initiating may involve sending instructions to the vehicle's control system to start adjusting the motion, it may involve providing instructions to a user of the vehicle 100 to manually start adjusting the motion etc. As a consequence of step 306, the vehicle's motion is adjusted, manually or automatically. The motion may be adjusted by for example keeping the maneuver on the side of the tracks or maneuver the vehicle 100 so that the racks are located between the wheels. If this is not possible, the speed may for example be reduced to manage longer stopping distance.

Step 308:

The vehicle system may create a map of a plurality of roads indicating the first parts 105 which has friction that affects the vehicle's expected motion. Thus, the vehicle system may create a map over tracks and patches of different kinds. The map may be accessible by the vehicle 100, it may be accessible by two or more vehicles 100. The map may be visible to the user of the vehicle 100 e.g. on a display unit associated with the vehicle 100. The map may be accessible by a cloud computer adapted to distribute the map to a plurality of vehicles 100.

Step 309:

The vehicle system may provide, to two or more vehicles 100, information indicating that the first part 105 is associated with the estimated friction that affects the vehicle's expected motion. Consequently, the lateral and/or longitudinal position of one or several vehicles 100 may be adjusted to avoid the treacherous first part 105, and to also collectively estimate the friction in and out of tracks.

The embodiments herein may be used for manual or autonomous driving of the vehicle 100, e.g. fully-autonomous driving or supervised automation, e.g. pilot assist. The embodiments herein may also be used in several active safety and user assistance features. For example, the embodiments herein may be used in automatic recovery from split-mu surfaces, using knowledge on where to steer to get back on a high-mu surface. Prevention of loss of control on a first part 105, either by longitudinal/lateral assistance to avoid entering the first part 105 or by assisting the user of the vehicle 100 to keep the vehicle 100 on a straight path while passing a low mu surface. Automatic speed reduction before entering a first part exemplified as a low mu surface to prevent loss of control, e.g. aqua planning on high speed roads. The embodiments herein may also be applied in collision avoidance systems using path planning for combined braking and steering to stay away from a first part 105 being exemplified with a low mu surfaces to prevent more collisions with other vehicles on the road.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term comprises/comprising when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "adapted to" used herein may also be referred to as "arranged to", "configured to", "capable of" or "operative to".

It should also be emphasised that the steps of the methods defined in the appended claims may, without departing from the embodiments herein, be performed in another order than the order in which they appear in the claims.

The invention claimed is:

1. A method performed by a vehicle system for handling conditions of a road on which a vehicle travels, the method comprising:
   detecting that a first part of the road has a first condition which is different from a second condition of a second part of the road;
   estimating friction of the first part;
   evaluating the estimated friction;
   determining that the vehicle's motion should be adjusted when a result of the evaluation indicates that the estimated friction of the first part of the road affects the vehicle's expected motion;
   initiating adjustment of the vehicle's motion on the road as determined; and
   creating a map of a plurality of roads including the road indicating first parts including the first part that have estimated friction including the estimated friction that affect the vehicle's expected motion, the map being accessible to a plurality of vehicles.

2. The method according to claim 1, wherein the result of the evaluation indicates that the estimated friction is associated with that the first condition is a treacherous condition.

3. The method according to claim 1, wherein the first part has a lower friction than the second part.

4. The method according to claim 1, further comprising:
   providing, to a plurality of vehicles, information indicating that the first part is associated with the estimated friction that affects the vehicle's expected motion.

5. The method according to claim 1, wherein the vehicle comprises at least one brake on each side of the vehicle, wherein the method further comprises:
   determining on which side the vehicle's brakes should be activated; and
   wherein the vehicle's motion should be adjusted so that the activated brakes are on the opposite side compared to the first part of the road.

6. The method according to claim 1, wherein the detection is performed based on at least one image of the road obtained by an image capturing device comprised in the vehicle or based on a friction sensor.

7. The method according to claim 1, wherein the vehicle's motion is adjusted by adjusting at least one of: the vehicle's lateral position, the vehicle's longitudinal position and the vehicle's speed.

8. The method according to claim 1, wherein the first condition is at least one of:
   patches and tracks.

9. The method according to claim 1, wherein the vehicle system is comprised in the vehicle, or wherein the vehicle system is an external vehicle system adapted to communicate with the vehicle.

10. The method according to claim 1, wherein the vehicle is a non-autonomous vehicle, a partly autonomous vehicle or a fully autonomous vehicle.

11. A vehicle system for handling conditions of a road on which a vehicle travels, the vehicle system comprising:
    a processor operable for:
    detecting that a first part of the road has a first condition which is different from a second condition of a second part of the road;
    estimating friction of the first part;
    evaluating the estimated friction;
    determining that the vehicle's motion should be adjusted when a result of the evaluation indicates that the estimated friction of the first part of the road affects the vehicle's expected motion;
    initiating adjustment of the vehicle's motion on the road as determined; and
    creating a map of a plurality of roads including the road indicating first parts including the first part that have estimated friction including the estimated friction that affect the vehicle's expected motion, the map being accessible to a plurality of vehicles.

12. The vehicle system according to claim 11, wherein the result of the evaluation indicates that the estimated friction is associated with that the first condition is a treacherous condition.

13. The vehicle system according to claim 11, wherein the first part has a lower friction than the second part.

14. The vehicle system according to claim 11, wherein the processor is further operable for:
    providing, to a plurality of vehicles, information indicating that the first part is associated with the estimated friction that affects the vehicle's expected motion.

15. The vehicle system according to claim 11, wherein the vehicle comprises at least one brake on each side of the vehicle, wherein the processor is further operable for:
    determining on which side the vehicle's brakes should be activated; and
    wherein the vehicle's motion should be adjusted so that the activated brakes are on the opposite side compared to the first part of the road.

16. The vehicle system according to claim 11, wherein the detection is performed based on at least one image of the road obtained by an image capturing device comprised in the vehicle or based on a friction sensor.

17. The vehicle system according to claim 11, wherein the vehicle's motion is adjusted by adjusting at least one of: the vehicle's lateral position, the vehicle's longitudinal position and the vehicle's speed.

18. The vehicle system according to claim 11, wherein the first condition is at least one of: patches and tracks.

19. The vehicle system according to claim 11, wherein the vehicle system is comprised in the vehicle, or wherein the vehicle system is an external vehicle system adapted to communicate with the vehicle.

20. The vehicle system according to claim 11, wherein the vehicle is a non-autonomous vehicle, a partly autonomous vehicle or a fully autonomous vehicle.

* * * * *